(No Model.)
E. BECKER.
ANALYTICAL BALANCE.
No. 336,546. Patented Feb. 23, 1886.
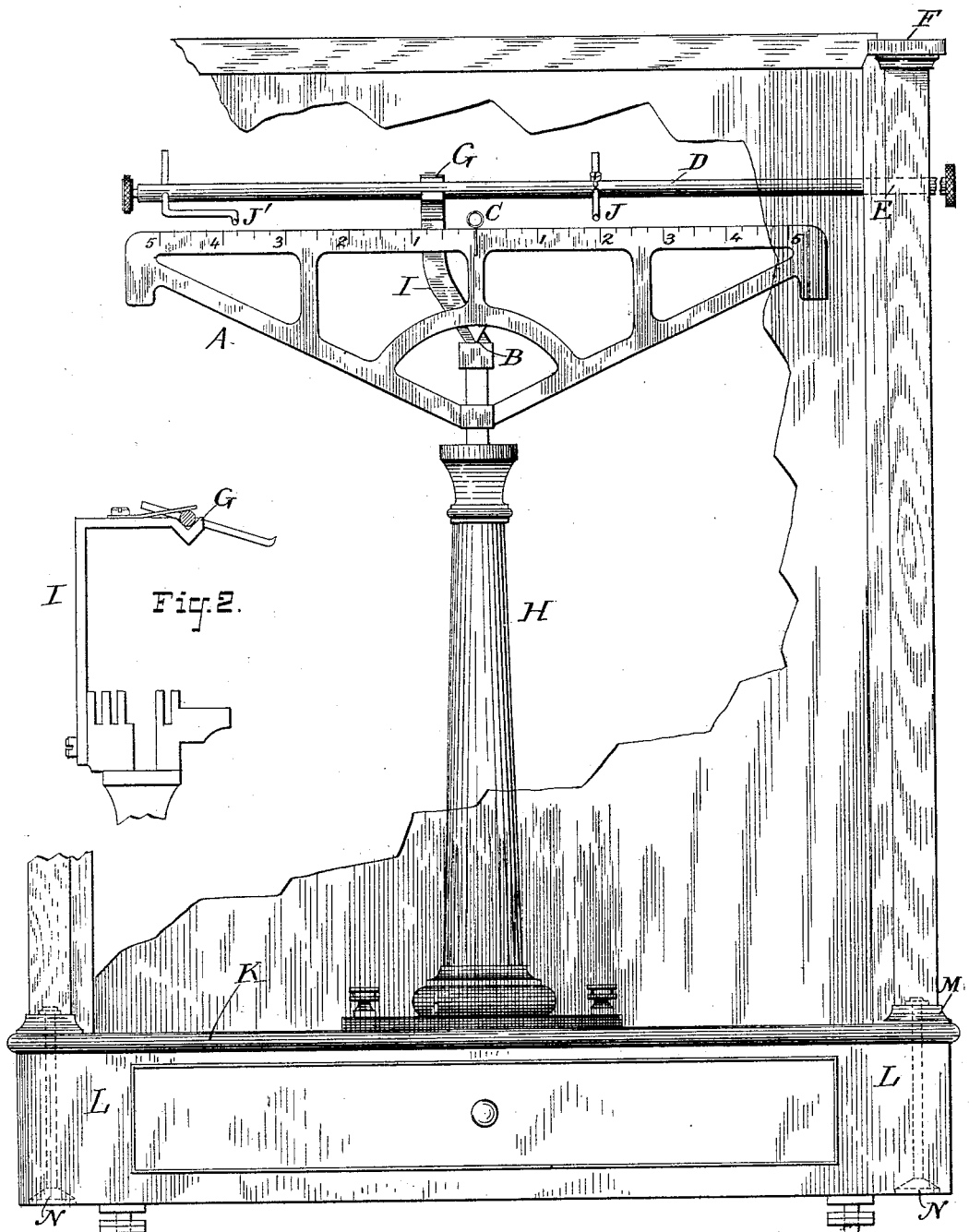

UNITED STATES PATENT OFFICE.

ERNST BECKER, OF NEW YORK, N. Y.

ANALYTICAL BALANCE.

SPECIFICATION forming part of Letters Patent No. 336,546, dated February 23, 1886.

Application filed June 11, 1885. Serial No. 168,359. (No model.)

*To all whom it may concern:*

Be it known that I, ERNST BECKER, a citizen of the United States, and a resident of the city, county, and State of New York, have invented certain new and useful Improvements in Analytical Balances, of which the following is a specification.

This invention relates, first, to the balance itself, and, secondly, to the support and casing for said balance.

The object of the first part of the invention is to provide a balance adapted to weigh objects with greater accuracy, and the object of the second part of the invention is to provide against the ill effects of warping of the wooden parts.

In the accompanying drawings, Figure 1 shows a general view of those parts of an analytical balance of the type usually constructed by Becker Bros., of New York city, involving my invention. Fig. 2 is a detail side view of a portion of Fig. 1.

A is a scale-beam graduated from one end to the other, balanced in the usual manner at its center B, and provided with a rider, C.

D is a rod capable of a rotary and longitudinal movement through the bearings E in the casing F, and G, connected to the pillar-support H rigidly by the projecting piece I, which is preferably of such a shape as to hold the bearing clear of the middle part of the scale, so as to leave plenty of room for the movements of the weight or rider C. This rod carries two lifters, J and J'. By the longitudinal and rotary movements of the rod D the lifter J, consisting of a projecting wire secured to the rod, will lift and carry the rider from the zero-mark on the scale to any division toward the right. The rod J', consisting of a wire bent twice, as shown, and secured to the rod D, serves a similar purpose for lifting and carrying the rider from the zero-mark of the scale to any division on the left, the said wire J' being so bent as not to interfere with the rod supporter and bearing G. In other words, the rider may be placed on the center of the beam, the latter being unobstructed throughout its entire length, and used from the zero-point to either end of the beam.

This first part of my invention may be varied; but what I claim may be learned from the claims annexed to this specification.

The second part of the device to which my invention relates consists of the glass plate K between the base L and the bottom M of the casing F, the said three parts being held rigidly together by the bolts N, passing through the three parts.

Heretofore the bearings E and G, although accurately in line when first constructed, would, after a time, become considerably out of line, on account of the difference or irregularity of rate of warping of the casing, the base of the support H, and the base of the casing. By the construction shown this difficulty is removed, and at the same time the construction is much cheaper than in those cases where the glass plate lies wholly within the casing, and where it serves, therefore, as a support for the pillar H only, and not for the casing.

A metal plate may be substituted for the glass with similar results; but the weight and want of a highly-polished and untarnishable surface would make the use of metal objectionable.

Having now particularly described and ascertained the nature of my said invention and in what manner the same is to be performed, I declare that what I claim, and desire to secure by Letters Patent in the United States, is—

1. In an analytical balance, a base, a casing, and a glass plate secured both to the said base and said casing, substantially as hereinbefore set forth in the annexed specification.

2. In an analytical balance, the combination of a base, a glass plate upon said base, a casing upon said glass plate, and bolts passing through the said base, said glass plate, and the bottom of said casing.

3. In an analytical balance, the combination of a scale-beam graduated from one end to the other, a weight or rider upon said scale-beam, a rod located near said beam, a pillar, H, a casing, F, two bearings for said rod, one of which is upon the pillar H and the other of which is upon the casing, the former bearing being toward one end of said scale-beam, and two lifters for said weight or rider, one of which is attached to said rod upon one side of the bearing which is secured to the pillar, and the other of which is upon the other side of the bearing which is secured to the pillar, substantially as and for the purpose set forth in the annexed specification and shown in the accompanying drawings.

In testimony that I claim the foregoing as my invention I have signed my name, in presence of two witnesses, this 8th day of June, 1885.

ERNST BECKER.

Witnesses:
EDWARD P. THOMPSON,
A. G. N. VERMILYA.